United States Patent [19]

Kamijo

[11] Patent Number: 4,519,652

[45] Date of Patent: May 28, 1985

[54] STRAP RETRACTOR ASSEMBLY

[75] Inventor: Ken Kamijo, Zushi, Japan

[73] Assignee: Nissan Motor Company, Limited, Yokohama, Japan

[21] Appl. No.: 457,128

[22] Filed: Jan. 11, 1983

[30] Foreign Application Priority Data

Feb. 3, 1982 [JP] Japan .................................. 57-15958

[51] Int. Cl.$^3$ ............................................ A62B 35/00
[52] U.S. Cl. .................................... 297/477; 180/268;
 200/61.58 B; 242/107.4 R; 280/807; 297/475
[58] Field of Search ............... 297/475, 477, 479, 480;
 200/61.46, 61.48, 61.58 B; 242/63, 67, 107.4 C,
 107.4 D, 107.4 E, 107.4 R; 280/806, 807;
 180/268

[56] References Cited

U.S. PATENT DOCUMENTS

| | | | |
|---|---|---|---|
| 3,767,134 | 10/1973 | Morales | 180/268 |
| 3,771,742 | 11/1973 | Okada | 242/107.4 R |
| 3,913,860 | 10/1975 | Takada | 200/61.58 B X |
| 3,986,093 | 10/1976 | Wakamatsu et al. | 280/802 |
| 3,987,864 | 10/1976 | Iijima et al. | 180/269 |
| 4,236,141 | 11/1980 | Terabayashi et al. | 340/52 E |
| 4,344,502 | 8/1982 | Terabayashi | 280/802 |
| 4,346,778 | 8/1982 | Bluggel | 180/268 |
| 4,387,862 | 6/1983 | Sakurada et al. | 280/807 X |
| 4,489,804 | 12/1984 | Kamijo | 180/268 |

FOREIGN PATENT DOCUMENTS 2809395 9/1979 Fed. Rep. of Germany .
1593722 7/1970 France .

OTHER PUBLICATIONS

Ser. No. 457,129 to Ken Kamijo, Filed Jan. 11, 1983.

Primary Examiner—William E. Lyddane
Assistant Examiner—Peter R. Brown
Attorney, Agent, or Firm—Lane, Aitken and Kananen

[57] ABSTRACT

A strap retractor assembly of a vehicular seat belt arrangement including a retaining strap to be fitted to a vehicle occupant, comprising a reel shaft having the strap anchored thereto at one end of the strap, a spring urging the reel shaft to turn in a direction to have the strap re-wound on the reel shaft, a ratchet wheel rotatable with the reel shaft, a pawl member movable into and out of a position engaging the ratchet wheel and prohibiting the reel shaft from being turned in the aforesaid direction, a switch unit to produce first pulses in response to rotation of the reel shaft in one direction and second pulses in response to rotation of the reel shaft in the opposite direction, a pulse counter to count the first pulses forwardly and the second pulses backwardly, a comparator to compare the number of the pulses counted by the counter with a predetermined number of pulses and to produce a control signal when the former equals the latter, and a solenoid-operated actuator to drive the pawl member into the aforesaid position in response to the control signal.

12 Claims, 5 Drawing Figures

STRAP RETRACTOR ASSEMBLY

FIELD OF THE INVENTION

The present invention relates to a strap retractor assembly for use in a vehicular seat belt arrangement and more particularly to a strap retractor assembly of the type which includes a slack-preventive tension lock mechanism-adapted to prohibit a retaining strap from being excessively tensioned on the occupant of a seat in a vehicle.

BACKGROUND OF THE INVENTION

A strap retractor assembly which is presently in use for a vehicular seat belt arrangement includes a tension lock mechanism for preventing a retaining strap from being tightly fitted on the seat occupant's body. Such a tension lock mechanism operates in cooperation with a solenoid operated actuator responsive to engagement between a tongue or male member and a buckle or female member which form part of the seat belt arrangement. When the tongue member is inserted into the buckle with the retaining strap withdrawn from the retractor assembly and fitted to the seat occupant, the solenoid-operated actuator is initiated into motion to prohibit the retaining strap from being retracted into the retractor assembly beyond a predetermined limit. A recently proposed version of such a tension lock mechanism has incorporated therein a slack-preventive feature by virtue of which the retaining strap once fitted tautly on the seat occupant's body is prohibited from being retracted into the retractor assembly in an adequately slackened condition. A slack-preventive tension lock mechanism of this nature is shown in, for example, Japanese Patent Application No. 52-132280.

The tension lock mechanism of such a prior-art strap retractor assembly is composed of mechanical members and elements such as gears and links and is for this reason responsible for the large-sized, intricate construction of the retractor assembly. The present invention contemplates an improved strap retractor assembly eliminating such a drawback.

SUMMARY OF THE INVENTION

In accordance with the present invention, there is provided a strap retractor assembly for use in a vehicular seat belt arrangement including an elongated flexible retaining strap to be fitted to an occupant of a seat structure in a vehicle body, comprising a reel shaft rotatable about an axis fixed with respect to the vehicle body and having the retaining strap anchored thereto at one end of the strap; biasing means urging the reel shaft to turn about the above mentioned axis in a direction to have the retaining strap re-wound on the reel shaft; a ratchet wheel rotatable with the reel shaft about the aforesaid axis; a pawl member movable into and out of a position engaging the ratchet wheel and prohibiting the ratchet wheel and the reel shaft from being turned in the above mentioned direction about the aforesaid axis; pulse generating means operative to produce first pulses in response to rotation of the reel shaft in one direction about aforesaid axis and second pulses in response to rotation of the reel shaft in the opposite direction about aforesaid axis; resettable pulse counting means operative to count the first pulses forwardly and the second pulses backwardly; comparing means operative to compare the number of the pulses counted by the pulse counting means with a predetermined number of pulses and to produce a control signal when the number of the pulses counted by the counting means is in a predetermined relationship to the predetermined number of pulses; and electro-magnetically operated actuating means responsive to the control signal and operative to drive the pawl member into the above mentioned position in response to the control signal. The strap retractor assembly according to the present invention may further comprise pulse transfer means intervening between the pulse generating means and the pulse counting means and operative to transfer pulses from the former to the latter; switch means responsive to a predetermined condition in which the retaining strap is ready to be fitted to the occupant of the seat structure; and enabling means intervening between the switch means and the pulse counting means, wherein, when the switch means is respondent to the aforesaid predetermined condition, the switch means is operative to enable the pulse generating means to transfer pulses from the pulse generating means to the pulse counting means and the enabling means is operative to count the pulses transferred thereto from the pulse generating means through the pulse transfer means.

BRIEF DESCRIPTION OF THE DRAWINGS

The features and advantages of a retractor assembly according to the present invention will be more clearly appreciated from the following description taken in conjunction with the accompanying drawings in which.

DESCRIPTION OF THE PREFERRED EMBODIMENT

Figure 1:
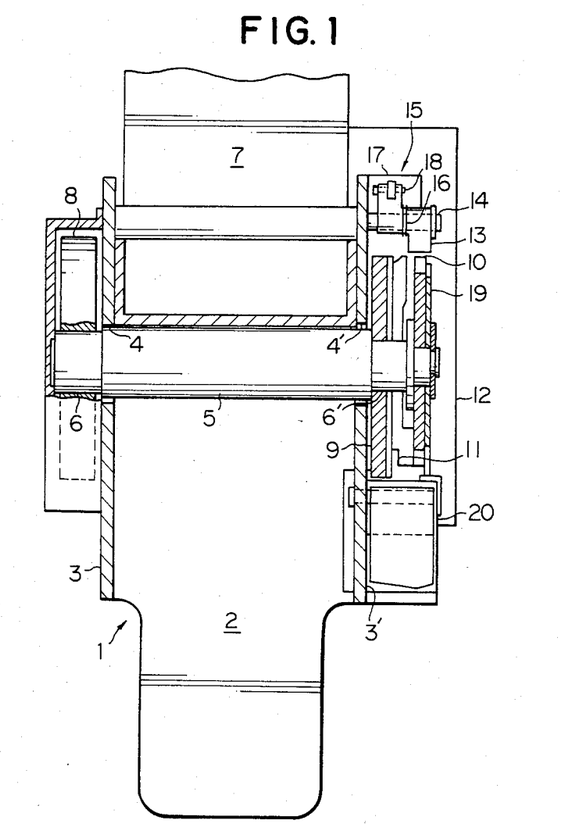
FIG. 1 is a sectional view showing the mechanical construction of a strap retractor assembly embodying the present invention.
Figure 2:
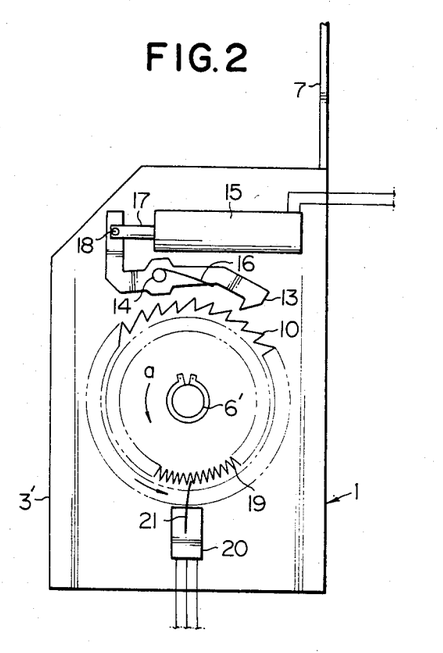
FIG. 2 is a side elevation view of the retractor assembly shown in FIG. 1.

Referring to FIGS. 1 and 2 of the drawings, a retractor assembly embodying the present invention comprises a casing 1 having a generally U-shaped cross section and thus consisting of a base wall portion 2 and a pair of side wall portions 3 and 3' projecting perpendicularly from the opposite side ends of the base wall portion 2. The side wall portions 3 and 3' are formed with circular openings 4 and 4' which are aligned with each other. A cylindrical reel shaft 5 is rotatably supported on the side wall portions 3 and 3' through these openings 4 and 4' and has opposite axial end portions 6 and 6' projecting outwardly from the openings 4 and 4', respectively. An elongated, flexible retaining strap 7 is anchored at one end thereof to the reel shaft 5 in a suitable manner and is re-wound in layers on the reel shaft 5 when the reel shaft 5 is driven for rotation in one direction about the center axis thereof. The reel shaft 5 is urged to turn in such a direction by suitable biasing means which is shown comprising a spiral coiled spring 8 anchored at one end thereof to one end portion 6 of the reel shaft 5 and at the other end thereof to a suitable spring retainer (not shown) which is securely connected to the side wall portion 3. Though not shown in the drawings, the casing 1 is securely attached to the vehicle body or to a seat structure installed on the floor panel of the vehicle body. The retaining strap 7 endwise extends from the retractor assembly obliquely over the seat structure and is passed through a looped tongue or male member to which, a buckle, or female member fastened to an auxiliary retaining is to be releasably fitted. The retaining strap 7 passed through the tongue member is anchored at its leading end to the vehicle body. The auxiliary retaining strap spliced at one end to the buckle is also anchored at its leading end to the vehicle body. The above mentioned seat structure is herein assumed to be of the type slidable forwardly and backwardly over the floor panel through manipulation of a seat slider lever and having a seat back tiltable through manipulation of a seat-back reclining lever, though not shown in the drawings.

The reel shaft 5 has securely carried on the other end portion 6' thereof first and second ratchet wheels 9 and 10 which are axially spaced apart from each other on the end portion 6' of the shaft 5. The first ratchet wheel 9 is to be engaged by a first pawl member 11 adapted to be driven for rocking motion by a known deceleration-sensitive actuating unit 12 using, for example, a mass member (not shown). The ratchet wheel 9, the pawl member 11 and such actuating means constitute in combination an emergency locking device in the retractor assembly embodying the present invention. On the other hand, the second ratchet wheel 10 is to be engaged by a second pawl member 13 which is rockable on a shaft 14 secured to the side wall portion 3' of the casing 1 and parallel with the reel shaft 5 and which is to be driven to turn about the center axis of the shaft 14 into and out of an angular position to engage the ratchet wheel 10 by means of a solenoid-operated lever actuator 15. The pawl member 13 is urged to turn out of such an angular position by means of a torsion spring 16 which has a coiled intermediate portion wound on the shaft 14 and an arm portion anchored to the pawl member 13 as shown in FIG. 2. The solenoid-operated lever actuator 15 includes a plunger 17 pivotally connected at its leading end to the second pawl member 13 by a pivot pin 18 and is operative to drive the plunger 17 to axially retract and thereby bring the pawl member 13 into locking engagement with the ratchet wheel 10 against the force of the torsion spring 16 when electrically energized. The first ratchet wheel 9 has its teeth inclined in one direction circumferentially of the ratchet wheel 9 and the second ratchet wheel 10 has its teeth inclined in the opposite direction circumferentially of the ratchet wheel 10. More particularly, the teeth of the first ratchet wheel 9 are inclined circumferentially of the ratchet wheel 9 in a direction to permit the first pawl member 11 to retain its hold on a tooth of the ratchet wheel 9 when the reel shaft 5 is forced to turn about the center axis thereof in a direction in which the retaining strap 7 is to be unwound from the reel shaft 5. When the reel shaft 5 is forced to turn in the opposite direction, viz., a direction in which the retaining strap 7 is to be re-wound on the reel shaft 5, the pawl member 11 is permitted to slide on the teeth of the first ratchet wheel 9 and allows the ratchet wheel 9 and the reel shaft 5 to rotate about the center axis of the reel shaft 5. On the other hand, the teeth of the second ratchet wheel 10 are inclined circumferentially of the ratchet wheel 10 in a direction to permit the second pawl member 13 to retain its hold on a tooth of the ratchet wheel 10 when the reel shaft 5 is forced to turn about the center axis thereof in a direction in which the retaining strap 7 is to be re-wound on the reel shaft 5. When the reel shaft 5 is forced to turn in the opposite direction, viz., a direction in which the retaining strap 7 is to be unwound from the reel shaft 5, the second pawl member 13 is permitted to slide on the teeth of the second ratchet wheel 10 and allows the ratchet wheel 10 and the reel shaft 5 to turn about the center axis of the reel shaft 5.

Figure 3:
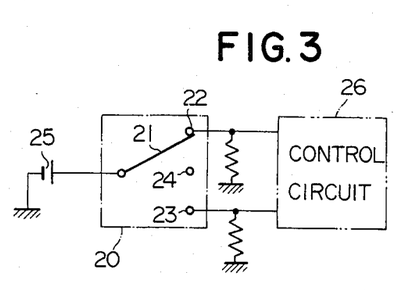
FIG. 3 a schematic view showing the arrangement of pulse generating means or a tumbler switch unit included in the retractor assembly shown in FIGS. 1 and 2.

The reel shaft 5 has further carried thereon a spur gear 19 having triangular teeth and securely attached to the second ratchet wheel 10. The spur gear 19 forms part of pulse generating means which further comprises a tumbler switch unit 20 mounted on the side wall portion 3' of the casing 1 and including an electrically conductive, elastic detector element 21 constantly engaged by the teeth of the gear 19 and rockable about an axis fixed with respect to the casing 1. When the gear 19 is driven for rotation with the second ratchet wheel 10 about the center axis of the reel shaft 5, the detector element 21 of the tumbler switch unit 20 is caused to rock about such an axis as the teeth of the gear 19 are successively brought into pressing engagement with the detector element 21. As shown in FIG. 3 of the drawings, the tumbler switch unit 20 further includes first and second stationary contact elements 22 and 23 and a third or neutral stationary contact element 24 located between the first and second stationary contact elements 22 and 23. The detector element 21 is connected to a power source 25 selectively through one of the first and second stationary contact elements 22 and 23. When the reel shaft 5 is driven for rotation about the center axis thereof in the direction in which the retaining strap 7 is to be unwound therefrom, the detector element 21 is caused to oscillate between the first and third stationary contact elements 22 and 24 so that the tumbler switch unit 20 produces a train of pulses $P_u$ in a number equal to the number of the teeth of the gear 19 which are brought into engagement with the detector element 21. When, on the other hand, the reel shaft 5 is driven for rotation about the center axis thereof the direction in which the retaining strap 7 is to be re-wound thereon, the detector element 21 is caused to oscillate between the second and third stationary contact elements 23 and 24 so that the tumbler switch unit 20 produces a train of pulses $P_w$ in a number equal to the number of the teeth of the gear 19 which are brought into engagement with the detector element 21. The pulses $P_u$ or $P_w$ thus produced by the tumbler switch unit 20 are supplied to a control circuit 26 adapted to energize the solenoid-operated lever actuator 15 on the basis of the pulse signals produced by the tumbler switch unit 20 and further on other predetermined conditions of the seat belt arrangement and the seat structure per se.

Figure 4:
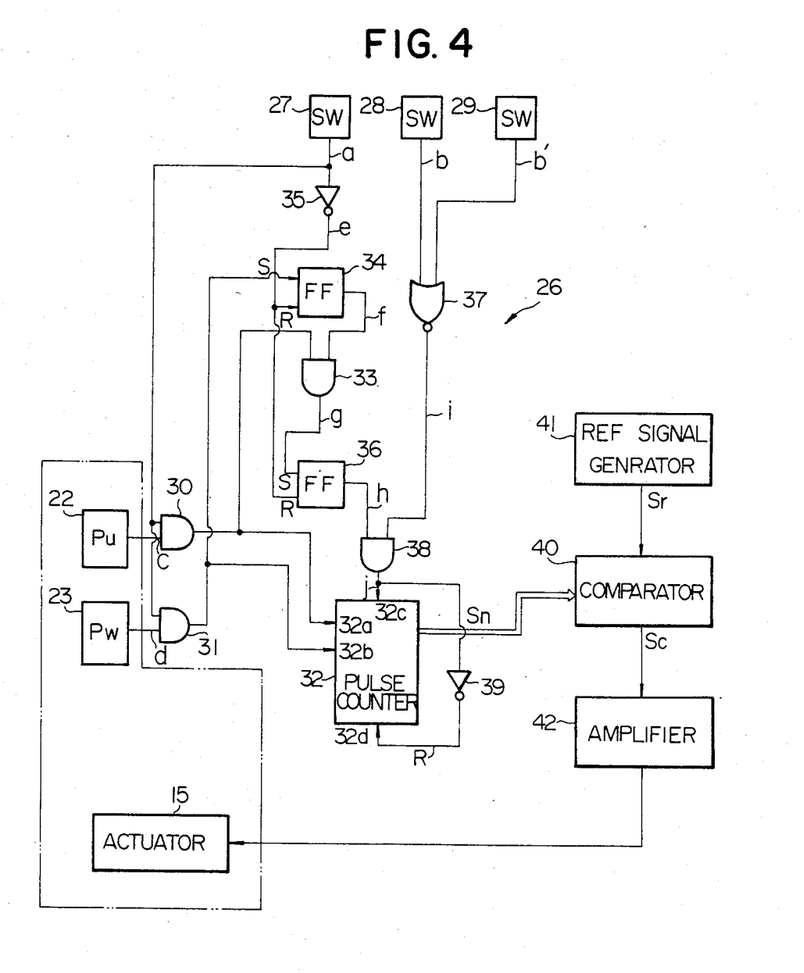
FIG. 4 is a circuit diagram showing the circuit arrangement of a control circuit forming part of the retractor assembly embodying the present invention.

Turning to FIG. 4 of the drawings, the control circuit 26 comprises a first or tongue-buckle switch 27, a second or seat-slide switch 28 and a third or seat-back reclining switch 29. The tongue-buckle switch 27 is adapted to close when the tongue member having the retaining strap 7 passed therethrough is fitted to the buckle fastened to the auxiliary retaining strap. The seat-slide switch 28 is adapted to close when the previously mentioned seat slide lever is being manipulated to drive the seat structure to move forwardly or rearwardly over the floor panel, and the seat-back reclining switch 29 is adapted to close when the previously mentioned seat-back reclining lever is being manipulated to drive the seat back of the seat structure to tilt upwardly or downwardly with respect to the seat cushion. The control circuit 26 further comprises two-input first and second logic "AND" gate circuits 30 and 31, each of which has one of its two input terminals connected to the tongue-buckle switch 27. The other input terminals of the first and second logic "AND" gate circuits 30 and 31 are connected to the first and second stationary contact elements 22 and 23, respectively, of the above described tumbler switch unit 20. Thus, the first logic "AND" gate circuit 30 is operative to pass therethrough the pulses from the first contact element 22 of the tumbler switch unit 20 when the retaining strap 7 is being unwound from the reel shaft 5 of the retractor assembly with the tongue member fitted to the buckle of the seat belt arrangement, while the second logic "AND" gate circuit 31 is operative to pass therethrough the pulses from the second contact element 23 of the tumbler switch unit 20 when the retaining strap 7 is being re-wound on the reel shaft 5 of the retractor assembly with the tongue member fitted to the buckle of the seat belt arrangement. The first and second logic "AND" gate circuits 30 and 31 have respective output terminals connected to first and second pulse input terminals 32a and 32b, respectively, of a ward-backward pulse counter 32 and thus constitute pulse transfer means operative to transfer the pulses $P_u$ or $P_w$ from the tumbler switch unit 20 to the pulse counter 32 in the presence of logic "1" signals on both input terminals of each of the logic "AND" gate circuits 30 and 31. The pulse counter 32 is adapted to count pulses forwardly in response to the pulses supplied thereto through the first pulse input terminal 32a and backwardly in response to the pulses supplied thereto through the second pulse input terminal 32b. The output terminal of the first logic "AND" gate circuit 30 is further connected to one input terminal of a two-input third logic "AND" gate circuit 33 while the other output terminal of the second logic "AND" gate circuit 31 is further connected to the set terminal S of a set-reset first flip-flop circuit 34. The tongue-buckle switch 27 is further connected through a first logic inverter 35 to the reset terminal R of the first flip-flop circuit 34 and to the reset terminal R of a second flip-flop circuit 36. The first flip-flop circuit 34 has an output terminal connected to the other input terminal of the third logic "AND" gate circuit 33, which in turn has an output terminal connected to the set terminal S of the second flip-flop circuit 36. On the other hand, the seat-slide switch 28 and seat-back reclining switch 29 are connected to the input terminals of a two-input logic "NOR" gate circuit 37. The logic "NOR" gate circuit 37 is thus operative to produce a logic "1" signal when, and only when, the seat-slide switch 28 and seat-back reclining switch 29 are open. The logic "NOR" gate circuit 37 and the second flip-flop circuit 36 have respective output terminals connected to the input terminals of a two-input fourth logic "AND" gate circuit 38. The fourth logic "AND" gate circuit 38 has an output terminal connected to a trigger terminal 32c of the forward-backward pulse counter 32 and further through a second logic inverter 39 to a clear terminal 32d of the pulse counter 32. The forward-backward pulse counter 32 has an output terminal 32e connected to a comparator 40 and is operative to deliver to the comparator 40 a signal $S_n$ representative of the number of the pulses counted by the pulse counter 32. The comparator 40 has a reference input terminal connected to a reference signal generator 41 which is operative to produce an output signal $S_r$ representative of a predetermined number of pulses. The comparator 40 is thus operative to compare the input signal $S_n$ representative of the number of the pulses counted by the pulse counter 32 with the reference signal $S_r$ representative of the predetermined number of pulses represented by the output signal $S_r$ from the reference signal generator 41 and to produce a control signal $S_c$ when the former becomes equal to the latter. The number of pulses registered in the reference signal generator 41 is selected to correspond to predetermined degree of slackness of the retaining strap 7 (FIGS. 1 and 2). The comparator 40 has an output terminal connected through an amplifier 42 to the solenoid coil (not shown) of the solenoid-operated lever actuator 15. The third and fourth logic "AND" gate circuits 33 and 38, the first and second flip-flop circuits 34 and 36 and the first and second logic inverters 35 and 39 of the control circuit 26 constitute enabling means to enable the pulse counter 32 to count the pulses transferred thereto from the tumbler switch unit 20 through the first and second logic "AND" gate circuits 30 and 31. On the other hand, the logic "NOR" gate circuit 37 constitutes disabling means to disable the pulse counter 32 from counting the pulses transferred thereto.

Figure 5:
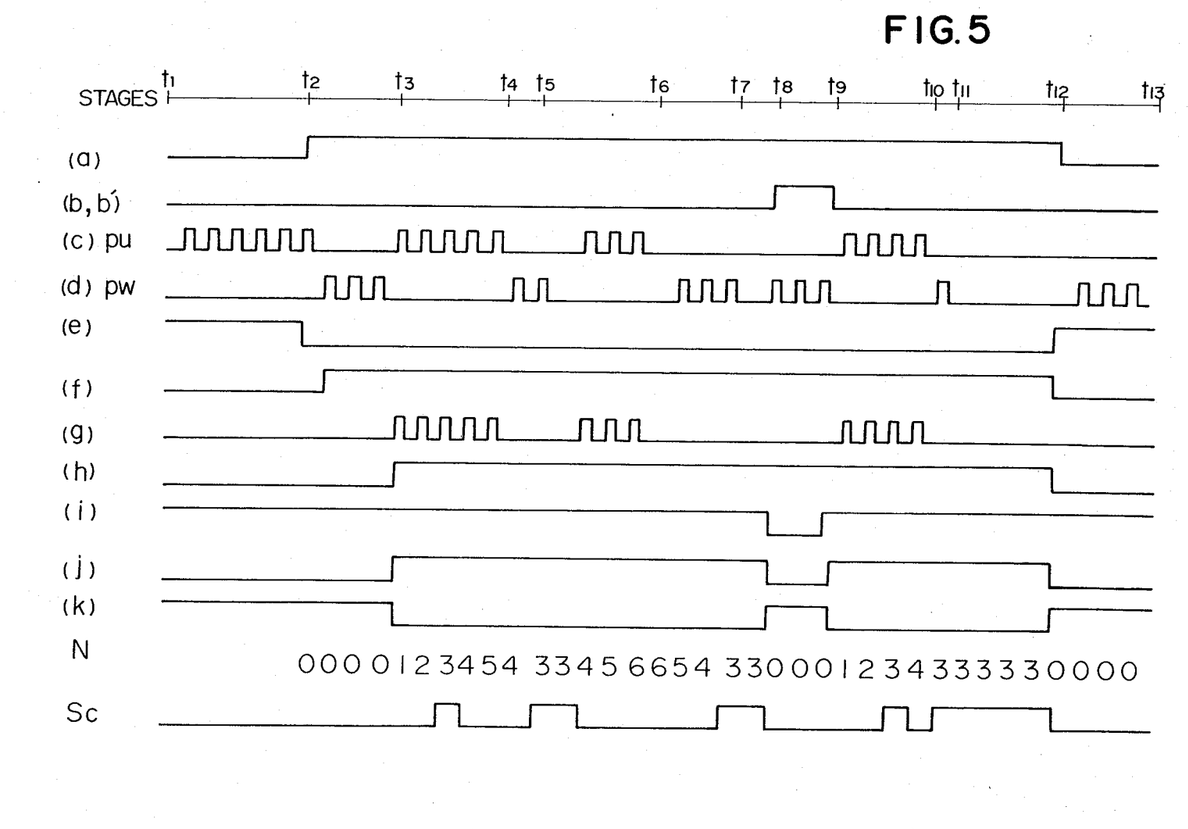
FIG. 5 is a view showing examples of the waveforms of signals to appear in the control circuit shown in FIG. 4.

Description will be hereinafter made regarding the operation of the retractor assembly embodying the present invention with reference to FIGS. 1 to 4 and further to FIG. 5. In FIG. 5, waveforms (a) to (k) are assumed to be those to appear on lines indicated a to k, respectively, in the control circuit 26 illustrated in FIG. 4. In the description to follow, it will be assumed by way of example that the number of pulses registered in the reference signal generator 41 of the control circuit 26 is three.

When, now, the retaining strap 7 of the seat belt arrangement is pulled away from the retractor assembly shown in FIGS. 1 and 2 so as to be fitted to the occupant of the seat structure as represented by phase $t_1-t_2$ in FIG. 5, the reel shaft 5 and accordingly the first and second ratchet wheels 9 and 10 thereon are forced to turn about the center axis of the reel shaft 5 against the force of the spiral coiled spring 8. Under these conditions, the emergency locking device 12 is maintained inoperative so that the first pawl member 11 is held disengaged from the first ratchet wheel 9 and permits the reel shaft 5 to rotate about the center axis thereof in a direction allowing the retaining strap 7 to be unwound therefrom. As the retaining strap 7 is thus unwound from the reel shaft 5 and as a consequence the reel shaft 5 is driven for rotation about the center axis thereof in such a direction as indicated by arrow a in FIG. 2, the detector element 21 of the tumbler switch unit 20 is caused to slide on the teeth of the gear 19 on the reel shaft 5 and accordingly to oscillate between the first and third stationary contact elements 22 and 24. A train of pulses $P_u$ are thus produced at the first stationary contact element 22 of the tumbler switch unit 19 (FIG. 3) as indicated by the waveform (c) in FIG. 5. Under the conditions in which the retaining strap 7 is being fitted to the seat occupant, the tongue member of the seat belt arrangement is detached from the buckle on the auxiliary retaining strap and, for this reason, the tongue-buckle switch 27 of the control circuit 26 (FIG. 4) is maintained open as indicated by the waveform (a)

in FIG. 5. The first logic "AND" gate circuit 30 is therefore held in a state producing a logic "0" signal at its output terminal. The second logic "AND" gate circuit 31 is also held in a state producing a logic "0" signal at its output terminal in the absence of a pulse on its input terminal connected to the second stationary contact element 23 of the tumbler switch unit 20 as indicated by the waveform (d) in FIG. 5. The pulses $P_u$ produced by the tumbler switch unit 20 are thus not passed to the forward-backward pulse counter 32 on the phase $t_1$–$t_2$.

When the tongue member of the seat belt arrangement is fitted to the buckle with the retaining strap 7 withdrawn to a certain length from the retractor assembly and thereupon the retaining strap 7 is released from the pull as at stage $t_2$, the retaining strap 7 is pulled toward and re-wound on the reel shaft 5 of the retractor assembly by the force of the spring 8 (FIG. 1) until the retaining strap 7 is fitted tightly against the seat occupant's body. At the point of time when the tongue member of the seat belt arrangement is fitted to the buckle, the tongue-buckle switch 27 is closed to produce a logic "1" signal as indicated by the waveform (a) in FIG. 5. The logic "1" signal thus produced is inverted into a logic "0" signal by means of the first logic inverter 35 as indicated by the waveform (e) in FIG. 5. As the retaining strap 7 is thus re-wound on the reel shaft 5 and as a consequence the reel shaft 5 is driven for rotation about the center axis thereof in a direction opposite to the direction of rotation indicated by the arrow a in FIG. 2, the detector element 21 of the tumbler switch unit 20 is caused to slide on the teeth of the gear 19 on the reel shaft 5 in a reverse direction and accordingly to oscillate between the second and third stationary contact elements 22 and 24. A train of pulses $P_w$ are thus produced at the second stationary contact element 23 of the tumbler switch unit 19 (FIG. 3) as indicated by the waveform (d) in FIG. 5. In the absence of pulses $P_u$ at one input terminal of the first logic "AND" gate circuit 30, the first logic "AND" gate circuit 30 and accordingly the third and fourth logic "AND" gate circuits 33 and 38 of the control circuit 26 are held in states producing logic "0" signals at their respective output terminals. The fourth logic "AND" gate circuit 38 being held in such a state, the forward-backward pulse counter 32 is maintained inoperative in the absence of a logic "1" signal at the trigger terminal 32c thereof. On phase $t_2$–$t_3$, the pulses $P_w$ produced by the tumbler switch unit 20 are thus passed through the second logic "AND" gate circuit 31 to the pulse counter 32 but are not counted thereby. The pulses $P_w$ passed through the second logic "AND" gate circuit 31 are fed not only to the pulse counter 32 but to the set terminal S of the first flip-flop circuit 34 and sets the flip-flop circuit 34, which is accordingly brought into a state producing a logic "1" signal at its output terminal in response to the first one of the pulses $P_w$ thus fed to the set terminal S of the flip-flop circuit 34 as indicated by the waveform (f) in FIG. 5.

When the retaining strap 7 now made taut on the seat occupant's body is then pulled out several centimeters from the retractor assembly so as to be slightly slackened from the occupant's body, the reel shaft 5 is caused to rotate for a second time in the direction of the arrow a (FIG. 2) about the center axis thereof so that the tumbler switch unit 20 is made operative to produce a train of pulses $P_u$ on phase $t_3$–$t_4$ as indicated by the waveform (c) in FIG. 5. In the presence of a logic "1" signal at the output terminal of the tongue-buckle switch 27 as above noted, the pulses $P_u$ produced by the switch unit 20 are passed through the first logic "AND" gate circuit 30 and are fed on one hand to the first input terminal 32a of the pulse counter 32 and on the other hand to the third logic "AND" gate circuit 33. In the presence of a logic "1" signal at the output terminal of the first flip-flop circuit 34, the third logic "AND" gate circuit 33 is rendered into a state producing logic "1" signals at its output terminal as indicated by the waveform (g) in FIG. 5. The logic "1" signals thus appearing at the output terminal of the third logic "AND" gate circuit 33 are fed to the set terminal S of the second flip-flop circuit 36, which is therefore caused to deliver a logic "1" signal to the fourth logic "AND" gate circuit 38 as indicated by the waveform (h) in FIG. 5. If, under these conditions, neither the seat slide lever nor the seat-back reclining lever is being manipulated, the seat-slide switch 28 and seat-back reclining switch 29 are kept open. Thus, there are logic "0" signals at both of the input terminals of the logic "NOR" gate circuit 37 as indicated by the waveform (b, b') in FIG. 5 so that the logic "NOR" gate circuit 37 is maintained in a condition producing a logic "1" signal on the output terminal thereof as indicated by the waveform (i) in FIG. 5. In the presence of logic "1" signals on both of the input terminals of the fourth logic "AND" gate circuit 38, a logic "1" signal is delivered from the output terminal of the fourth logic "AND" gate circuit 38 to the trigger terminal 32c of the pulse counter 32 as indicated by the waveform (j) in FIG. 5. The logic "1" signal appearing at the output terminal of the fourth logic "AND" gate circuit 38 is further inverted into a logic "0" signal by means of the second logic inverter 39 as indicated by the waveform (k) in FIG. 5. The logic "0" signal thus produced at the output terminal of the logic inverter 39 is fed to the clear terminal 32d of the pulse counter 32. The pulse counter 32 is in this fashion maintained operative as long as a logic "1" signal is present at the output terminal of the fourth logic "AND" gate circuit 38, viz., until the first and second flip-flop circuits 34 and 36 are reset with the tongue member of the seat belt arrangement detached from the buckle or at least one of the seat slide lever and the seat-back reclining lever is manually actuated.

The pulse counter 32 being made operative, the pulses $P_u$ produced by the tumbler switch unit 20 are counted forwardly by the pulse counter 32, which therefore produces an output signal $S_n$ indicative of the number N of the pulses $P_u$ counted by the pulse counter 32 as indicated in FIG. 5. The signal $S_n$ is fed to the comparator 40 and is compared with the reference signal $S_r$ registered in the reference signal generator 41 and representative of a series of three pulses. When the number N of the pulses $P_u$ counted by the pulse counter 32 equals three, a control signal $S_c$ is delivered from the comparator 40 to the solenoid coil of the solenoid-operated lever actuator 15 (FIGS. 1 and 2) by way of the amplifier 42. The solenoid coil of the lever actuator 15 being thus energized, the plunger 17 of the lever actuator 15 is caused to axially retract and drives the second pawl member 13 to turn about the center axis of the shaft 14 into an angular position mating with one of the teeth of the second ratchet wheel 10, thereby prohibiting the ratchet wheel 10 and accordingly the reel shaft 5 from being rotated about the center axis of the reel shaft 5 in the direction (opposite to the direction of the arrow a in FIG. 2) allowing the retaining strap 7 to be re-wound on the reel shaft 5. The retaining strap 7 prevented from being re-wound on the reel shaft 5 in this manner is permitted to be further unwound from the reel shaft 5. If the retaining strap 7 is further unwound from the reel shaft 5 after the number N of the pulses $P_u$ counted by the pulse counter 32 has equaled three, the comparator 40 ceases delivery of the control signal $S_c$ so that the solenoid coil of the lever actuator 15 is de-energized and as a consequence the second pawl member 13 is disengaged from the second ratchet wheel 10, allowing the retaining strap 7 to be re-wound on the reel shaft 5.

If the retaining strap 7 is then released from the pull as at stage $t_4$, the retaining strap 7 is re-wound on the reel shaft 5 by the force of the spring 8 so that the tumbler switch unit 20 produces pulses $P_w$ for a second time. The pulses $P_w$ are passed through the second logic "AND" gate circuit 31 to the second input terminal $32b$ of the forward-backward pulse counter 32 and are counted backwardly. When the number N of the forwardly counted pulses $P_u$ and the backwardly counted pulses $P_w$ is reduced to three as at stage $t_5$, the comparator 40 is for a second time made operative to produce the control siganl $S_c$ as will be seen from FIG. 5 and a consequence the second pawl member 13 is brought into engagement with the second ratchet wheel 10 by the action of the lever actuator 15, prohibiting the retaining strap 7 from being further re-wound on the reel shaft 5. The reel shaft 5 is in these manners fitted to the seat occupant's body with an optimum degree of slackness dictated by the number of the pulses registered in the reference signal generator 41.

If the retaining strap 7 fitted to the seat occupant's body as above described is pulled and unwound from the reel shaft 5 by the seat occupant who desires to assume, for example, a more relaxed posture on the seat, the tumbler switch unit 20 delivers pulses $P_u$ to the first input terminal $32a$ of the pulse counter 32 through the first logic "AND" gate circuit 30. It therefore follows that the count of the pulses increases from three on phase $t_5$-$t_6$, causing the comparator 40 to cease delivery of the control signal $S_c$. The solenoid coil of the lever actuator 15 is therefore de-energized and as a consequence the second ratchet wheel 10 is liberated from the second pawl member 12, allowing the retaining strap 7 to be re-wound on the reel shaft 5. When the retaining strap 7 is then released from the pull as at stage $t_6$, the retaining strap 7 is re-wound on the reel shaft 5 by the force of the spring 8 so that the tumbler switch unit 20 produces pulses $P_w$ until the number N of the pulses $P_u$ and $P_w$ which have been counted forwardly and backwardly is reduced to three as at stage $t_7$. The solenoid-operated lever actuator 15 is thus made operative to drive the second pawl member 13 into engagement with the second ratchet wheel 10 so as to prohibit the retaining strap 7 from being further re-wound on the reel shaft 5.

When, on the other hand, either the seat slide lever or the seat-back reclining lever is manually actuated to move the seat structure forwardly or backwardly in the vehicle body or to cause the seat back to tilt upwardly or downwardly over the floor panel, the seat-slide switch 28 or the seat-back reclining switch 29 is closed. A logic "1" signal now appears at one of the input terminals of the logic "NOR" gate circuit 37, which is accordingly rendered into a state producing a logic "0" signal on the output terminal thereof as at stage $t_8$. In response to the logic "0" signal thus appearing on the out terminal of the logic "NOR" gate circuit 37, the fourth logic "AND" gate circuit 38 is shifted to a state producing a logic "0" signal on the output terminal thereof. The logic "0" signal on the output terminal of the logic "AND" gate circuit 38 is converted by means of the second logic inverter 39 into a logic "1" signal, which is fed to the clear terminal $32d$ of the pulse counter 32 and clears the pulses which have been registered in the pulse counter 32. The pulse counter 32 is now disabled and makes the comparator 40 inoperative, causing the solenoid-operated lever actuator 15 to drive the second pawl member 13 out of engagement with the second ratchet wheel 10 and allowing the retaining strap 7 to be re-wound on the reel shaft 5. The reel shaft 5 can thereafter be fitted to the seat occupant's body on phases $t_9$-$t_{10}$ and $t_{10}$-$t_{11}$ which are similar to phases $t_3$-$t_4$ and $t_4$-$t_5$.

If the tongue member of the seat belt arrangement is separated from the buckle on the auxiliary retaining strap, the tongue-buckle switch 27 is made open so that a logic "0" signal appears at the output terminal thereof as at stage $t_{12}$ as indicated by the waveform (a) in FIG. 5. The logic "0" signal is converted by the first logic inverter 35 into a logic "1" signal, which is fed to the reset terminal R of each of the first and second flip-flop circuits 34 and 36, thereby resetting the flip-flop circuits 34 and 36. The logic "0" signal produced at the output terminal of the tongue-buckle switch 27 is also fed to the first and second logic "AND" gate circuits 30 and 31 and renders these logic "AND" gate circuits 30 and 21 into states producing logic "0" signals at the respective output terminals thereof. The logic "0" signal appearing at the output terminal of the first logic "AND" gate circuit 30 is fed to one input terminal of the second logic "AND" gate circuit 33, while the logic "0" signal appearing at the output terminal of the second logic "AND" gate circuit 31 is fed to the set terminal S of the first flip-flop circuit 34. Thus, the first, second, third and fourth logic "AND" gate circuits 30, 31, 33 and 38 and the first and second flip-flop circuits 34 and 36 are all rendered inoperative. In the absence of a control signal $S_c$ at the output terminal of the comparator 40 under these conditions, the solenoid-operated lever actuator 15 is also maintained inoperative so that the retaining strap 7 which is now released from the auxiliary retaining strap is withdrawn to the retractor assembly by the force of the spring 8 (FIGS. 1 and 2). The reel shaft 5 is thus driven for rotation in the direction to have the reel shaft 5 re-wound thereon until the reel shaft 5 is fully withdrawn to the retractor assembly. This causes the tumbler switch unit 20 to produce a certain number of pulses $P_w$ on phase $t_{12}$-$t_{13}$ as indicated by the waveform of (d) in FIG. 5.

While the reference signal generator 41 in the control circuit 26 of the retractor assembly embodying the present invention has been assumed to be adapted to have a predetermined number of pulses fixedly registered therein, such a signal generator may be replaced with a reference signal generator having a number of pulses adjustably registered therein.

What is claimed is:

1. A strap retractor assembly for use in a vehicular seat belt arrangement including an elongated flexible retaining strap to be fitted to an occupant of a seat structure in a vehicle body, comprising:
   a reel shaft rotatable about an axis fixed with respect to the vehicle body and having said retaining strap anchored thereto at one end of the strap;

biasing means urging the reel shaft to turn about said axis in a direction to have the retaining strap rewound on the reel shaft;

a ratchet wheel rotatable with the reel shaft about said axis;

a pawl member movable into and out of a position engaging the ratchet wheel and prohibiting the ratchet wheel and the reel shaft from being turned in said direction about said axis;

pulse generating means positioned in the vicinity of said ratchet wheel and operative to produce first pulses in response to rotation of the reel shaft in one direction about said axis and second pulses in response to rotation of the reel shaft in the opposite direction about said axis;

resettable pulse counting means electrically connected to said pulse generating means and operative to count said first pulses forwardly and said second pulses backwardly;

comparing means electrically connected to said pulse counting means and operative to compare the number of the pulses counted by said pulse counting means with a predetermined number of pulses and to produce a control signal when the number of the pulses counted by the counting means is in a predetermined relationship to the predetermined number of pulses; and electro-magnetically operated actuating means electrically connected to said comparing means and responsive to said control signal and operative to drive said pawl member into said position in response to the control signal.

2. A strap retractor assembly as set forth in claim 1, further comprising pulse transfer means operatively positioned between said pulse generating means and said pulse counting means and operative to transfer pulses from the former to the latter; and switch means electrically connected to said pulse transfer means and said pulse counting means and responsive to a predetermined condition in which said retaining strap is ready to be fitted to the occupant of the seat structure, said switch means being operative to enable said pulse generating means to transfer pulses from said pulse generating means to said pulse counting means when the switch means is respondent to said predetermined condition.

3. A strap retractor assembly as set forth in claim 1, further comprising means operatively positioned between said pulse generating means and said pulse counting means and responsive to a predetermined condition in which said retaining strap is ready to be fitted to the occupant of the seat structure; and enabling means operatively positioned between said switch means and said pulse counting means and operative to enable the pulse counting means to count the pulses transferred thereto from the pulse generating means when the switch means is respondent to said predetermined condition.

4. A strap retractor assemby as set forth in claim 1, further comprising pulse transfer means operatively positioned between said pulse generating means and said pulse counting means and operative to transfer pulses from the former to the latter; switch means electrically connected to said pulse transfer means and said pulse counting means and responsive to a predetermined condition in which said retaining strap is ready to be fitted to the occupant of the seat structure; and enabling means operatively positioned between said switch means and said pulse counting means, wherein, when the switch means is respondent to said predetermined condition, said switch means is operative to enable said pulse transfer means to transfer pulses from said pulse generating means to said pulse counting means and said enabling means is operative to count the pulses transferred thereto from the pulse generating means through said pulse transfer means.

5. A strap retractor assembly as set forth in claim 1, further comprising pulse transfer means operatively positioned between said pulse generating means and said pulse counting means and operative to transfer pulses from the former to the latter; first switch means electrically connected to said pulse transfer means and said pulse counting means and responsive to a predetermined condition in which said retaining strap is ready to be fitted to the occupant of the seat structure; enabling means operatively positioned between said switch means and said pulse counting means; said first switch means being operative to enable said pulse transfer means to transfer pulses from said pulse generating means to said pulse counting means and said enabling means being operative to enable said pulse counting means to count the pulses transferred thereto from the pulse generating means through said pulse transfer means when the switch means is respondent to said predetermined condition; second switch means electrically connected to said pulse counting means and responsive to a predetermined condition of said seat structure; and disabling means operatively positioned between said second switch means and said pulse counting means and operative to disable the pulse counting means from counting the pulses transferred thereto from the pulse generating means through said pulse transfer means when the second switch means is respondent to said predetermined condition of the seat structure.

6. A strap retractor assembly as set forth in claim 5, in which said pulse counting means comprises first and second pulse input terminals connnected to said first switch means and to said pulse generating means through said pulse transfer means, a trigger terminal connected to said first switch means through said enabling means for enabling the counting means to count pulses when the first switch means is respondent to said predetermined condition of the retaining strap, a clear terminal, connected to said first switch means through said enabling means and to said second switch means through said disabling means for resetting the counting means when the first switch means is not respondent to said predetermined condition of the retaining strap, and an output terminal connected to said comparing means.

7. A strap retractor assembly as set forth in claim 5, in which said pulse counting means comprises first and second pulse input terminals connected to said first switch means and to said pulse generating means through said pulse transfer means, a trigger terminal connected to said first switch means through said enabling means for enabling the counting means to count pulses when the first switch means is respondent to said predetermined condition of the retaining strap, a clear terminal connected to said first switch means through said enabling means and to said second switch means through said disabling means for resetting the counting means when the second switch means is not respondent to said predetermined condition of the seat structure, and an output terminal connected to said comparing means.

8. A strap retractor assembly as set forth in claim 6 or 7, in which said pulse transfer means comprises a first logic "AND" gate circuit having one input terminal connected to said first switch means, another input terminal connected to said pulse generating means and responsive to said first pulses and an output terminal connected to the first pulse input terminal of said pulse counting means, a second logic "AND" gate circuit having one input terminal connected to said first switch means, another input terminal connected to said pulse generating means and responsive to said second pulses and an output terminal connected to the second pulse input terminal of said pulse counting means.

9. A strap retractor assembly as set forth in claim 8, in which said enabling means comprises third and fourth logic "AND" gate circuits each having a pair of input terminals and an output terminal, resettable first and second register circuits each having a set terminal, a reset terminal and an output terminal and first and second logic inverters each having input and output terminals, the third logic "AND" gate circuit having its input terminals respectively connected to the output terminal of said first logic "AND" gate circuit and to the output terminal of said first register circuit and its output terminal connected to the set terminal of said second register circuit, the fourth logic "AND" gate circuit having one of its input terminals connected to the output terminal of said second register circuit and its output terminal connected to the trigger terminal of said pulse counting means, the other input terminal of the fourth logic "AND" gate circuit being connected to said disabling means, the first register circuit having its set terminal connected to the output terminal of said second logic "AND" gate circuit, said first logic inverter having its input terminal connected to said first switch means and its output terminal connected to the reset terminal of each of the first and second register circuits, the second logic inverter having its input terminal connected to the output terminal of said fourth logic "AND" gate circuit and its output terminal connected to the clear terminal of said pulse counting means.

10. A strap retractor assembly as set forth in any one of claims 1 to 6 or 7 in which said pulse generating means comprises a spur gear rotatable with said reel shaft about said axis, an electrically-conductive detector element engaging the teeth of said gear and operative to slide on said teeth in either direction depending upon the direction of rotation of the reel shaft, and a pair of spaced stationary contact elements which are fixed with respect to the vehicle body, said detector element being movable into and out of contact with one of the contact elements for producing said first pulse when the reel shaft is driven for rotation in one direction about said axis and with the other of the contact elements for producing said second pulses when the reel shaft is driven for rotation in the opposite direction about said axis.

11. A strap retractor assembly as set forth in claim 7, in which said pulse generating means comprises a spur gear rotatable with said reel shaft about said axis, an electrically-conductive detector element engaging the teeth of said gear and operative to slide on said teeth in either direction depending upon the direction of rotation of the reel shaft, and a pair of spaced stationary contact elements which are fixed with respect to the vehicle body, said detector element being movable into and out of contact with one of the contact elements for producing said first pulse when the reel shaft is driven for rotation in one direction about said axis and with the other of the contact elements for producing said second pulses when the reel shaft is driven for rotation in the opposite direction about said axis.

12. A strap retractor assembly as set forth in claim 8, in which said pulse generating means comprises a spur gear rotatable with said reel shaft about said axis, an electrically-conductive detector element engaging the teeth of said gear and operative to slide on said teeth in either direction depending upon the direction of rotation of the reel shaft, and a pair of spaced stationary contact elements which are fixed with respect to the vehicle body, said detector element being movable into and out of contact with one of the contact elements for producing said first pulse when the reel shaft is driven for rotation in one direction about said axis and with the other of the contact elements for producing said second pulses when the reel shaft is driven for rotation in the opposite direction about said axis.

* * * * *